(12) United States Patent
Metzger

(10) Patent No.: US 9,057,553 B1
(45) Date of Patent: Jun. 16, 2015

(54) DUAL PASS AIR CONDITIONING UNIT

(75) Inventor: Edward H. Metzger, Duluth, GA (US)

(73) Assignee: MJC, Inc., Marietta, GA (US)

( * ) Notice: Subject to any disclaimer, the term of this patent is extended or adjusted under 35 U.S.C. 154(b) by 1501 days.

(21) Appl. No.: 12/391,476

(22) Filed: Feb. 24, 2009

Related U.S. Application Data

(60) Provisional application No. 61/036,563, filed on Mar. 14, 2008.

(51) Int. Cl.
F25D 17/06 (2006.01)
F24F 7/00 (2006.01)

(52) U.S. Cl.
CPC ...................... *F25D 17/06* (2013.01)

(58) Field of Classification Search
USPC ............................................ 454/237; 62/412
See application file for complete search history.

(56) References Cited

U.S. PATENT DOCUMENTS

| | | | | |
|---|---|---|---|---|
| 2,401,560 | A * | 6/1946 | Graham et al. | 165/59 |
| 2,779,572 | A * | 1/1957 | Holman | 165/48.1 |
| 2,959,036 | A * | 11/1960 | Mehalick | 62/427 |
| 3,665,727 | A * | 5/1972 | Mather | 62/262 |
| 3,766,750 | A * | 10/1973 | Aoh et al. | 62/259.1 |
| 4,139,052 | A * | 2/1979 | Lackey | 165/59 |
| 4,248,173 | A * | 2/1981 | Kuhlman | 118/20 |
| 4,281,522 | A * | 8/1981 | Bussjager | 62/409 |
| 4,347,708 | A * | 9/1982 | Bussjager | 62/95 |
| 4,874,040 | A * | 10/1989 | Herrmann | 165/122 |
| 5,038,577 | A * | 8/1991 | Stanford | 62/262 |
| 5,237,831 | A * | 8/1993 | Sikora | 62/159 |
| 5,582,026 | A * | 12/1996 | Barto, Sr. | 62/298 |
| 6,089,464 | A * | 7/2000 | Morgan | 236/49.3 |
| 6,612,365 | B1 * | 9/2003 | Saishu et al. | 165/54 |
| 7,059,400 | B2 * | 6/2006 | Sekhar et al. | 165/205 |
| 7,174,741 | B2 * | 2/2007 | Lee et al. | 62/412 |

(Continued)

FOREIGN PATENT DOCUMENTS

JP 04244537 A * 9/1992

OTHER PUBLICATIONS

AAON, Inc. "RM RN Series", Revision 2, Mar. 2006, 4 pages.

(Continued)

*Primary Examiner* — Steven B McAllister
*Assistant Examiner* — Samantha Miller
(74) *Attorney, Agent, or Firm* — Lee & Hayes, PLLC

(57) ABSTRACT

Apparatus and methods provide for a dual pass air flow configuration in an air conditioning system to improve efficiency and performance of the air conditioning system. An air conditioning device includes a pre-conditioned air passage chamber separated from a post-conditioned air passage chamber by an impermeable partition. A coil system separates the pre-conditioned air passage chamber and the post-conditioned air passage chamber from a partially-conditioned air passage chamber. The coil system is configured to receive air from the pre-conditioned air passage chamber and to condition the air passing through the coil system into the partially-conditioned air passage chamber. The coil system is also configured to receive the air from the partially-conditioned air and further condition the air as it passes through the coil system into the post-conditioned air passage chamber.

8 Claims, 9 Drawing Sheets

(56) References Cited

U.S. PATENT DOCUMENTS

| | | | |
|---|---|---|---|
| 7,802,443 B2* | 9/2010 | Wetzel | 62/262 |
| 2005/0056042 A1* | 3/2005 | Bourne et al. | 62/310 |
| 2005/0235678 A1* | 10/2005 | Lee et al. | 62/412 |
| 2006/0270335 A1* | 11/2006 | Kim et al. | 454/237 |
| 2007/0082242 A1* | 4/2007 | Meltser et al. | 429/22 |
| 2008/0115528 A1* | 5/2008 | Yamamoto et al. | 62/513 |

OTHER PUBLICATIONS

Mosco, "Morganizer: Hot Gas Reheat Unit: 3-130 Tons", © 2005-2007, 131 pages.

Munters, "HCU Series: Desiccant Dehumidifier", May 12, 2003, 2 pages.

Semco Incorporated, "Lodging Application Guide", accessed May 13, 2009, 12 pages.

* cited by examiner

DUAL PASS AIR CONDITIONING UNIT

CROSS-REFERENCE TO RELATED APPLICATIONS

This application claims the benefit of U.S. Provisional Patent Application No. 61/036,563, filed on Mar. 14, 2008, and entitled "Dual Path Evaporator Coil Airflow," which is expressly incorporated herein by reference in its entirety.

BACKGROUND

Conventional air conditioning units include return air conditioning units that use return air, return/outside air conditioning units that use a combination of return and outside air and units that are dedicated to condition outside air only. A return air conditioning unit receives return air from a facility that the air conditioning unit is servicing. The return air is conditioned by passing through a cooling coil and supplied to the facility. In a return/outside air conditioning unit, the return air is typically mixed with the outside air before or after it passes through a cooling coil. On the other hand, a dedicated outside air conditioning unit receives outside air from the atmosphere and conditions it by passing through a cooling coil and thereby supplies conditioned air to the facility it is servicing.

In both conventional return/outside air conditioning units and dedicated outside air conditioning units, air enters through one side of a cooling coil and exits from the other side of the cooling coil in a single pass air flow configuration. However, because return air and outside air commonly have different properties, such as in humidity content and temperature, several differences between return air conditioning units and outside air conditioning units are prevalent. For example, because outside air may be warmer and more humid than return air, outside air conditioning units tend to pass air through cooling coils at a slower face velocity across the cooling coil than return/outside air conditioning units. Additionally, the cooling coil of a dedicated outside air conditioning unit may be sized differently than a return air conditioning unit. For instance, the cooling coil of an outside air conditioning unit will typically have a smaller surface area with more rows of coil in order to more efficiently cool the warmer outside air as it passes through the cooling coil system.

If an unmodified return/outside air conditioning unit were to be used to condition outside air, in order to reduce the temperature of the outside air to the desired air temperature, the face velocity at which the outside air would travel through the cooling coil would be a lot slower compared to the face velocity at which return air would travel through the cooling coil system. Because the velocity of the outside air travelling through the cooling coils is too slow, the cooling coils may freeze since heat is not being transferred from the outside air to the cooling coils fast enough to prevent the coil from freezing. For these reasons, utilizing conventional return/outside air conditioning units to condition outside air is not possible without enduring considerable expense for exchanging the cooling coils and/or the fan to prevent the cooling coils from freezing while adequately conditioning the outside air.

It is with respect to these considerations and others that the disclosure made herein are presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a dual pass air conditioning device. According to one aspect of the disclosure provided herein, an air conditioning device includes a pre-conditioned air passage chamber that includes an air entry aperture to receive air. The air conditioning device further includes a post-conditioned air passage chamber that includes an air exit aperture to supply air. An impermeable partition separates the pre-conditioned air passage chamber and the post-conditioned air passage chamber. A partially-conditioned air passage chamber fluidly connects the pre-conditioned air passage chamber and the post-conditioned air passage chamber. A cooling coil system is positioned to provide a permeable wall to each of the pre-conditioned air passage chamber, the post-conditioned air passage chamber, and the partially-conditioned air passage chamber. The cooling coil system is configured to receive air from the pre-conditioned air passage chamber and to condition the air as it passes into the partially-conditioned air passage chamber. The cooling coil system receives the air from the partially-conditioned air passage chamber and further conditions the air as it passes back through the cooling coil system into the post-conditioned air passage chamber.

According to another aspect, a method for conditioning air includes routing air into a pre-conditioned air passage chamber. The air is routed from the pre-conditioned air passage chamber through the cooling coil system into a partially-conditioned air passage chamber. The air is then routed from the partially-conditioned air passage chamber through the cooling coil system into a post-conditioned air passage chamber and into a facility via an air exit.

According to another aspect, a method of reconfiguring a return air conditioning device configured to condition facility return air to an air conditioning device configured to condition outside air includes partitioning the air output side downstream of a cooling coil system of the return air conditioning device to create a pre-conditioned air passage chamber and a post-conditioned air passage chamber. An air entry is relocated from an upstream side of the cooling coil system of the return air conditioning device to the pre-conditioned air passage chamber such that the upstream side of the cooling coil system of the return air conditioning device becomes a partially-conditioned air passage chamber configured to accept air routed through the cooling coil system from the pre-conditioned air passage chamber and to route the air back through the cooling coil system to the post-conditioned air passage chamber.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to apparatus and methods for a dual pass air flow configuration in an air conditioning system to significantly improve energy efficiency and performance of the air conditioning system. As discussed briefly above, conventional air conditioning systems route air in one direction through a cooling coil system that may comprise of a single coil or multiple, adjacent coils. Because of the temperature and humidity differences between return air and outside air, the cooling coil systems in return air conditioning devices and outside air conditioning devices are different.

Utilizing the concepts and technologies described herein, an air conditioning device configured for return air may be reconfigured to operate as an outside air conditioning device. The air conditioning device is reconfigured to include a pre-conditioned air passage chamber separated from a post-conditioned air passage chamber by an impermeable partition. Further, the reconfigured air conditioning device includes a cooling coil system that separates the pre-conditioned air passage chamber and the post-conditioned air passage chamber from a partially-conditioned air passage chamber. According to various embodiments below, air is routed through the cooling coil system twice, from the pre-conditioned air passage chamber through the cooling coil system to a partially-conditioned air passage chamber, and then back through the cooling coil system to the post-conditioned air passage chamber. By doing so, the same cooling coil system and blowers used in return air conditioning units can be used in outside air conditioning units, saving costs associated with respect to replacing the cooling coil system and various other parts of a return air conditioning unit.

Figure 1:
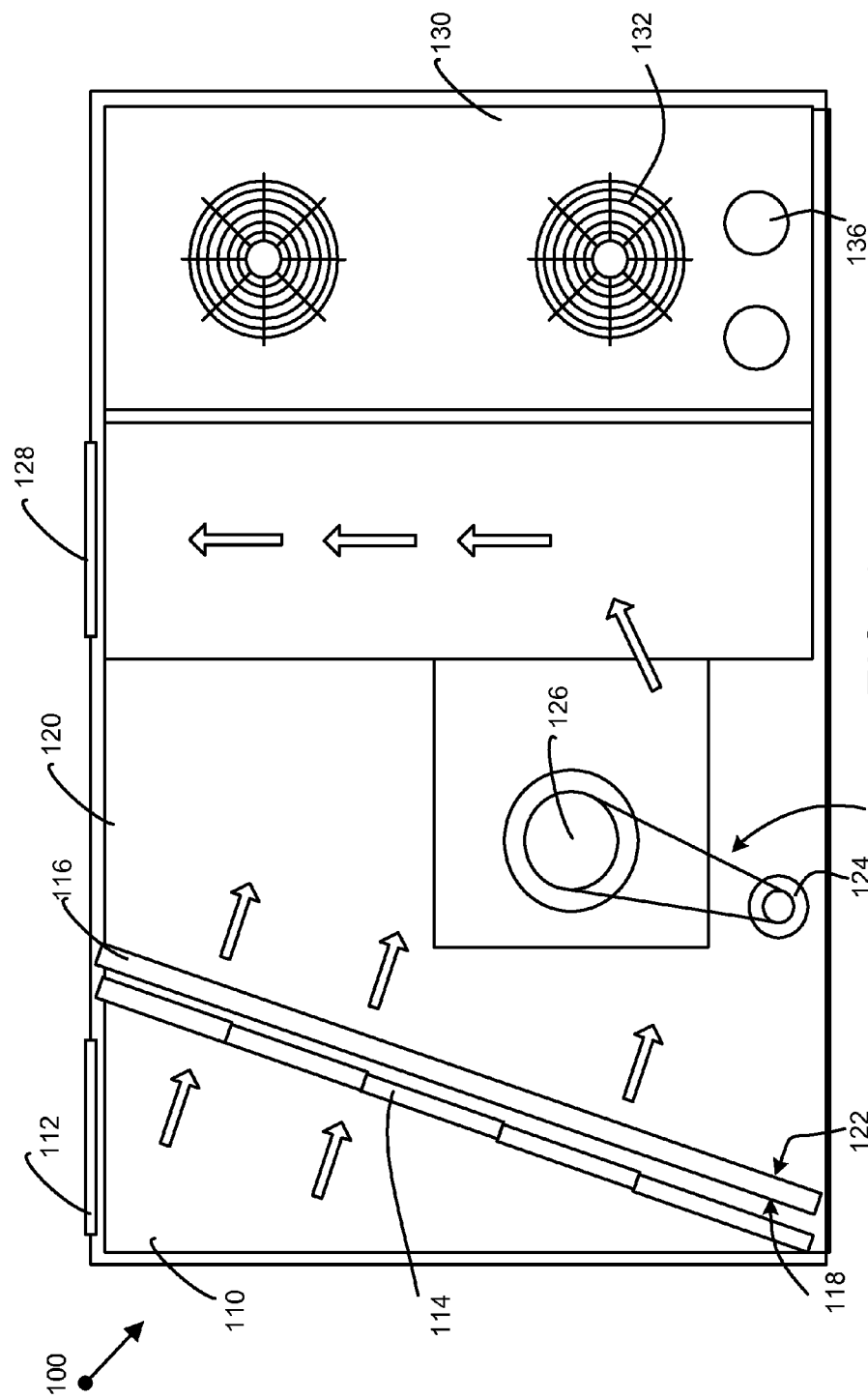
FIG. 1 is a plan view of a conventional air conditioning unit including a cooling coil system according to the prior art.

In the following detailed description, references are made to the accompanying drawings that form a part hereof, and which are shown by way of illustration, specific embodiments, or examples. Referring now to the drawings, in which like numerals represent like elements through the several figures, air conditioning devices according to the various embodiments will be described. FIG. 1 shows a conventional air conditioning device 100 configured to route air through a cooling coil system in a single air flow path. The conventional air conditioning device 100 includes a conventional cooling coil system 116 that includes a single conventional cooling coil or a combination of coils mounted adjacent to one another such that the coils are positioned within a single plane. It should be appreciated by those skilled in the art that the conventional cooling coil system 116, as well as the cooling coil system 216 described below, may include any number of cooling coils configured adjacent to one another in a single plane.

Returning to FIG. 1, the conventional cooling coil system 116 includes an upstream surface 118 and a downstream surface 122. The cooling coil system 116 separates an air intake side 110 from an air output side 120 of the conventional air conditioning device 100, such that pre-conditioned air from the air intake side 110 enters the conventional cooling coil system 116 from the upstream surface 118 and passes into the air output side 120 through the downstream surface 122. The air intake side 110 may include a filter system 114, that may be either a single filter or a set of filters that are positioned adjacent the upstream surface 118 of the conventional cooling coil system 116, such that pre-conditioned air passes through the filter system 114 prior to entering the conventional cooling coil system 116. The air intake side 110 further includes an air entry aperture 112 for receiving return air from a facility, outside air or a combination of both return air and outside air. It should be appreciated that air entering through the air entry aperture 112 may mix with the pre-conditioned air occupying the air intake side 110. The air output side 120 includes an air velocity control device 125, such as a blower 124 operated by a motor 126 to route air from the air entry aperture 112 through the conventional cooling coil system 116 to the air output aperture 128 into the facility. Further, the air conditioning device 100 may include other components that are typical in air conditioning units, such as a condensing section 130 that includes at least one compressor 136 and at least one condenser fan 132.

Figure 2A:
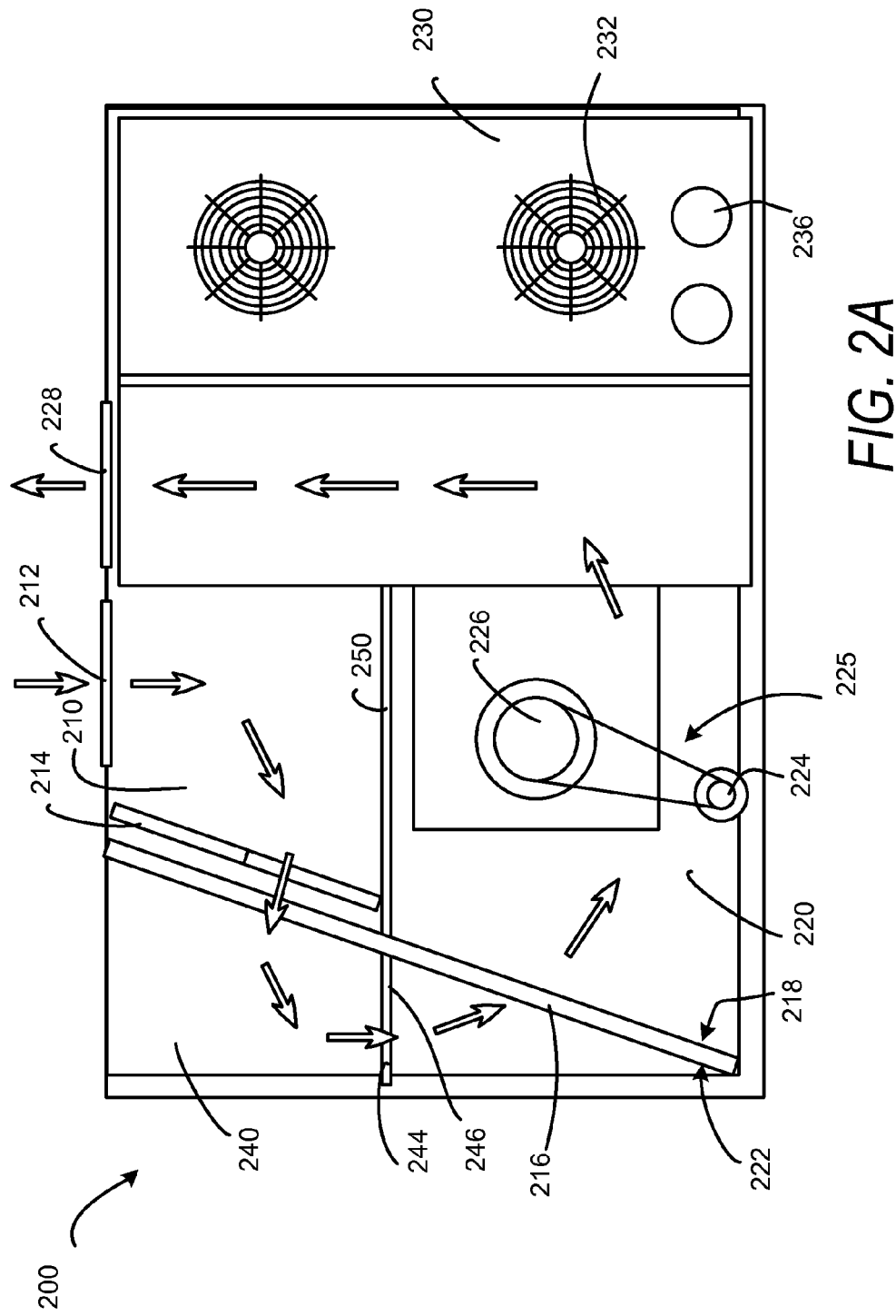
FIG. 2A is a plan view of an air conditioning unit including the cooling coil system of FIG. 1 according to one embodiment of the present disclosure.

FIG. 2A illustrates an air conditioning device 200 according to one embodiment of the present disclosure. The air conditioning device 200 includes a pre-conditioned air passage chamber 210 that includes an air entry aperture 212 to receive pre-conditioned air from outside a facility that is being serviced by the air conditioning device 200. The air conditioning device 200 also includes a post-conditioned air passage chamber 220 that includes an air exit aperture 228 for supplying conditioned air to the facility. An impermeable partition 250 separates the pre-conditioned air passage chamber 210 and the post-conditioned air passage chamber 220. The partition 250 is sealed to the walls of the air conditioning device 200 such that pre-conditioned air inside the pre-conditioned air passage chamber 210 is prevented from flowing directly to the post-conditioned air passage chamber 220 without passing through the cooling coil system 216. The air conditioning device 200 further includes a partially-conditioned air passage chamber 240 that fluidly connects the pre-conditioned air passage chamber 210 to the post-conditioned air passage chamber 220 so that air is routed back through the cooling coil system 216.

As described above, the cooling coil system 216 may include a conventional cooling coil or a series of coils arranged together. Refrigerant flows within the coils of the cooling coil system 216 to cool and otherwise condition the air passing between the coils as it is routed from one side of the cooling coil system 216 to the other. The cooling coil system 216 includes a first surface 218 and a second surface 222. As seen in FIG. 2A, the first surface 218 is exposed to air leaving the pre-conditioned air passage chamber 210 and to air entering the post-conditioned air passage chamber 220. The second surface 222 of the cooling coil system 216 is exposed to air entering and leaving the partially-conditioned air passage chamber 240. It should be appreciated that the cooling coil system 216 also includes evaporator fins (not shown) positioned along the cooling coil system 216 to assist in the heat exchange process.

The air conditioning device 200 may also include an air flow diversion component 246, which may be positioned inside the partially-conditioned air passage chamber 240 such that air entering the partially-conditioned air passage chamber 240 from the pre-conditioned air passage chamber 210 is prevented from exiting the partially-conditioned air passage chamber 240 from a region closest to the partition 250. The air flow diversion component 246 may be a perforated partition or a partial extension of the partition 250. The disclosure presented herein is not limited to the use of the air flow diversion component 246, however without the air flow diversion component 246, the cooling coil system 216 may not receive a uniform air flow volume throughout the surface area of the cooling coil system 216 that separates the partially-conditioned air passage chamber 240 and the post-conditioned air passage chamber 220, thereby adversely affecting the performance of the cooling coil system 216.

Figure 5:
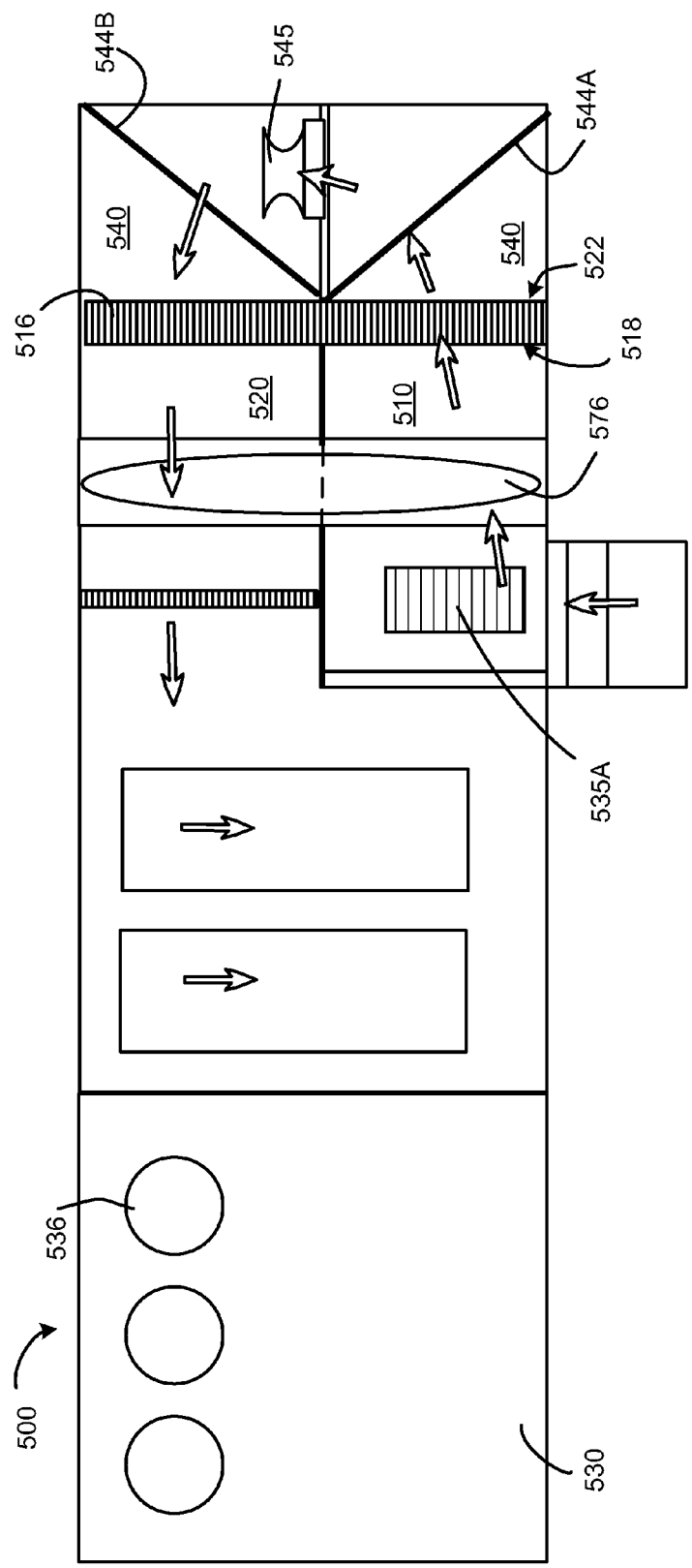
FIG. 5 is a plan view of an air conditioning unit including an energy wheel positioned inside the air conditioning unit according to an alternative embodiment of the present disclosure.

Additionally, the air conditioning device 200 may include a diffuser 244. The diffuser 244 may have various functions that include, but are not limited to enhancing the mixing of the air with the surrounding air, which may assist in evenly distributing the air. Those skilled in the art will appreciate that the diffuser 244 may improve the performance of the air conditioning device 200 but is not necessary for its functioning. In one embodiment, the diffuser 244 includes a honeycomb filter whereas according to another embodiment, the diffuser 244 includes a fan. Positioning the diffuser 244 inside the partially-conditioned air passage chamber 240 may assist in evenly distributing the partially-conditioned air inside the volume defined by the partially-conditioned air passage chamber 240, such that the partially-conditioned air passes through the cooling coil system 216 at uniform speed and pressure. According to various embodiments, the air flow diversion component 246 may include the diffuser 244 or the diffuser 244 and the air flow diversion component 246 may be separate components positioned to abut one another. It should be appreciated by those skilled in the art, as shown in FIG. 5 below, that the diffuser 244 may be positioned at any location within the partially-conditioned air passage chamber 240. Similarly, any number of diffusers 244 may be used, or the air conditioning device 200 may be operated without the use of a diffuser 244.

FIG. 2A also includes the air velocity control device 225 that includes a blower 226 operated by a motor 224. The air velocity control device 225 may operate at variable speeds depending upon the quality and condition of the air. For instance, the air velocity control device 225 may operate at a higher speed if the differential between the temperature of the outside air and the desired temperature of the supply air is smaller. If there is a larger temperature differential, the air velocity control device 225 may operate at a slower speed such that the air travels at a slower velocity through the cooling coil system 216 to allow the cooling coil system 216 to absorb more heat from the air passing through the cooling coil system 216.

Figure 2B:
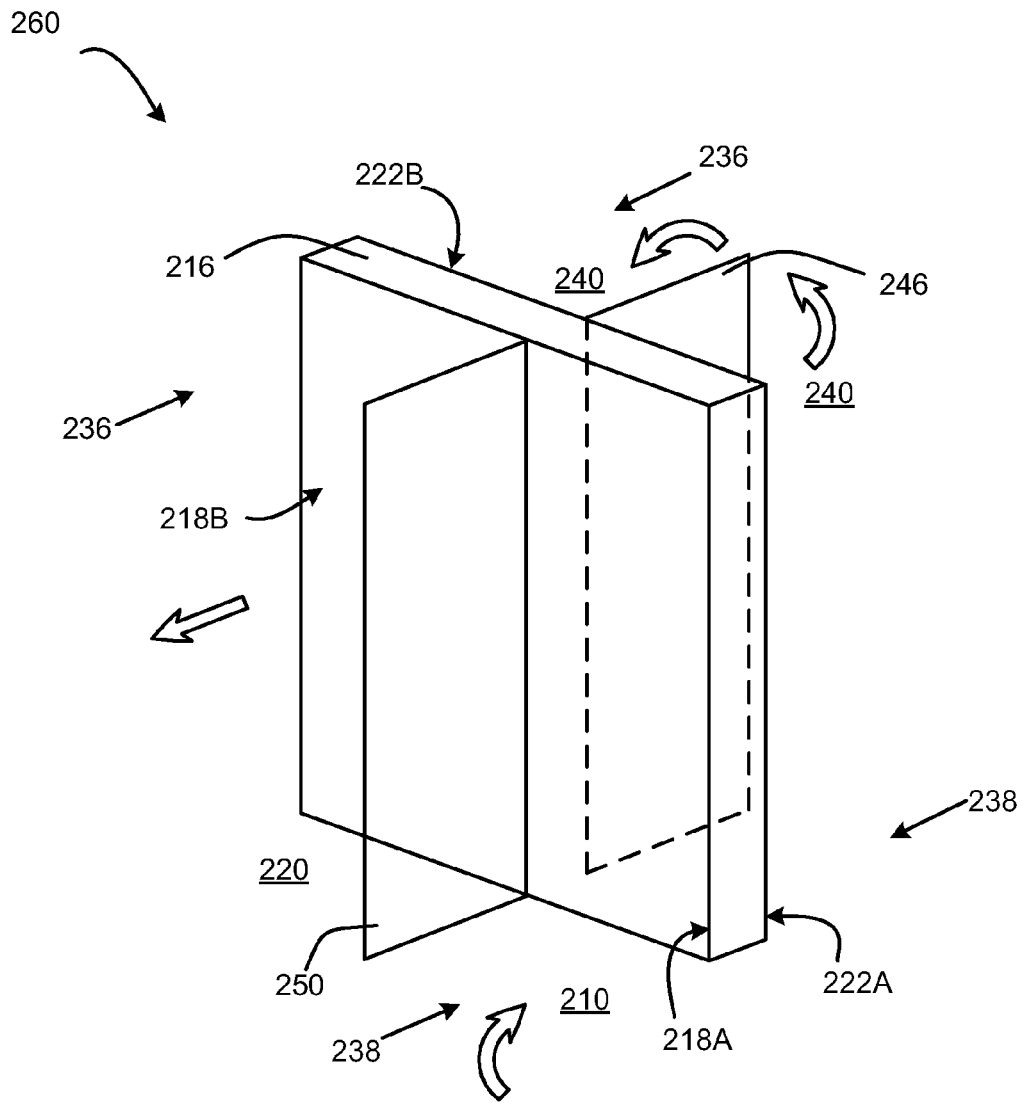
FIG. 2B is a perspective view of a vertical split configuration of the cooling coil system according to the embodiment shown in FIG. 2A.

Referring to FIG. 2B, a vertical split configuration 260 of the cooling coil system 216 of FIG. 2A is shown. The first surface 218 of the cooling coil system 216 is vertically split in to an entry portion 218A and an exit portion 218B, while the second surface 222 is vertically split in to an entry portion 222A and an exit portion 222B. The partition 250 and the air flow diversion component 246 are configured to lie in a plane that splits the cooling coil system vertically, such that the cooling coil system 216 is split into a left side 236 and a right side 238. Air enters the partially-conditioned air passage chamber 240 from the right side 238 of the cooling coil system 216 and exits the partially-conditioned air passage chamber 240 from the left side 236 of the cooling coil system 216, as shown by the arrows in FIG. 2B. It should be appreciated that the partition 250 may bisect the cooling coil system 216 such that the left and right side form two equal halves or split the cooling coil system 216 at various positions of the cooling coil system 216 such that the left side and right side are not equally sized.

Figure 2C:
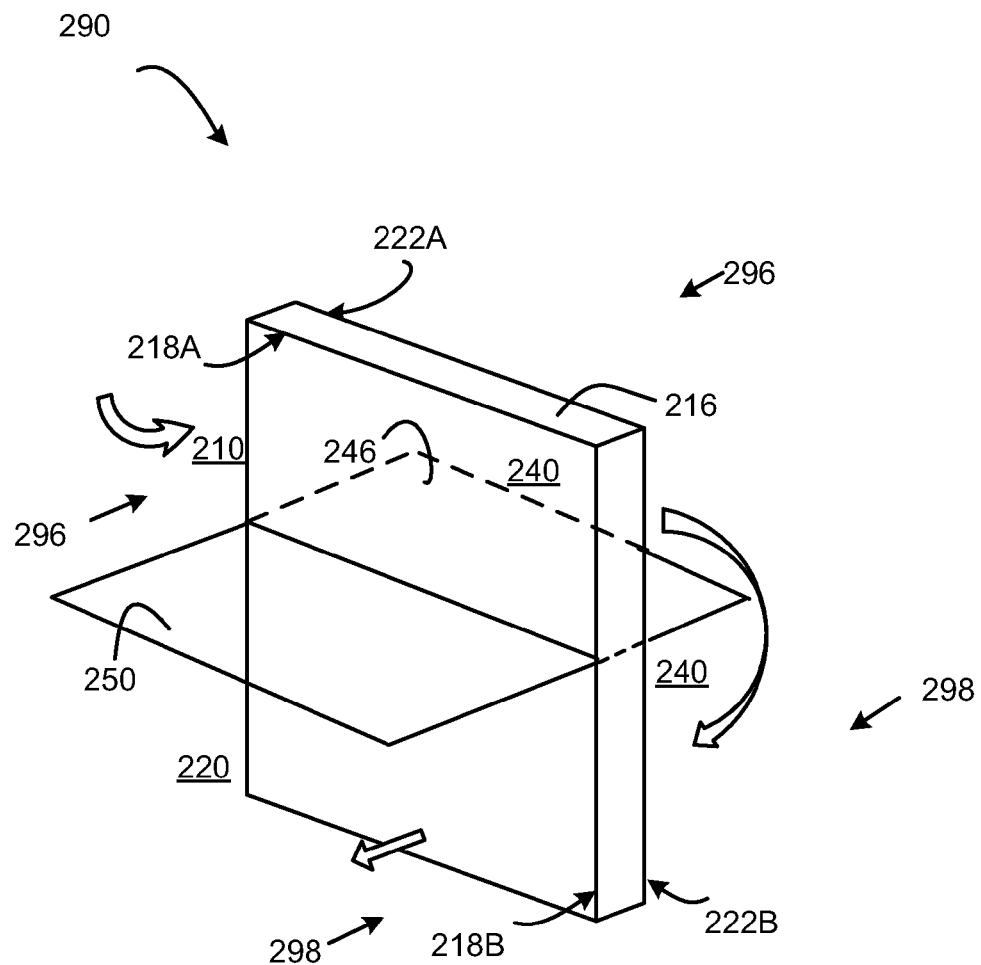
FIG. 2C is a perspective view of a horizontal split configuration of the cooling coil system according to an alternative embodiment of the present disclosure.

FIG. 2C shows an alternative embodiment of the air conditioning device 200 to illustrate how the partition 250 and an air flow diversion component 246 may be configured in a horizontal split configuration 290. The cooling coil system 216 may be the same as the cooling coil system 216 shown in FIG. 2B. However, the arrangement of the partition 250 and the air flow diversion component 246 relative to the cooling coil system 216 is different, such that the partition 250 and the air flow diversion component 246 lie in a plane that bisects the cooling coil system 216 horizontally, splitting the cooling coil system 216 to a top side 296 and a bottom side 298. Air enters the partially-conditioned air passage chamber 240 from the top side 296 of the cooling coil system 286 and exits the partially-conditioned air passage chamber 240 from the bottom side 298 of the cooling coil system 286, as shown by the arrows in FIG. 2C. Those skilled in the art may appreciate that the cooling coil system 216 may be split in any direction as long as air is able to pass through the cooling coil system and back through the cooling system before being supplied to the facility.

Figure 3:
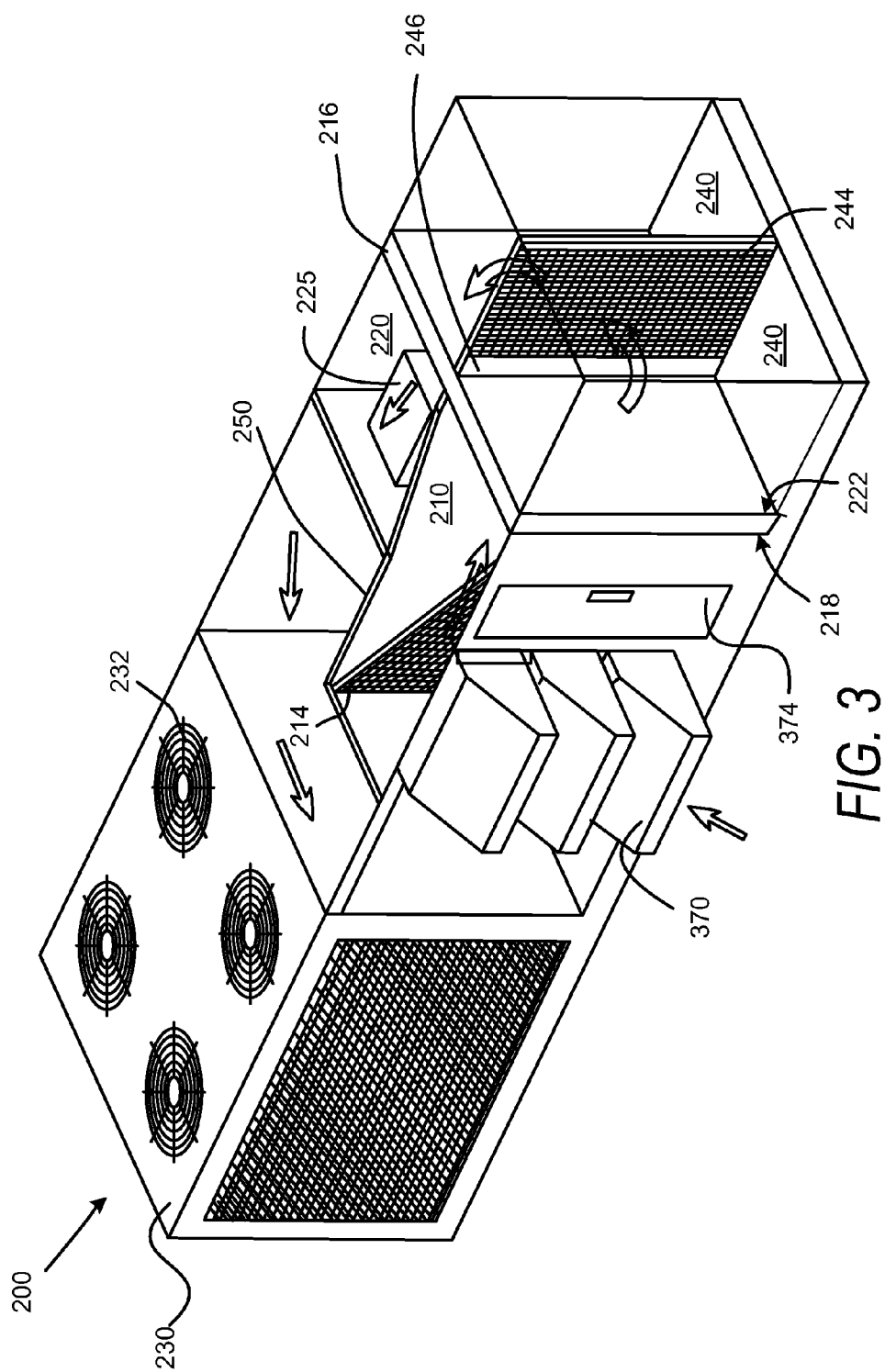
FIG. 3 is a perspective view of an outside air unit according to the embodiment shown in FIG. 2A.
Figure 4:
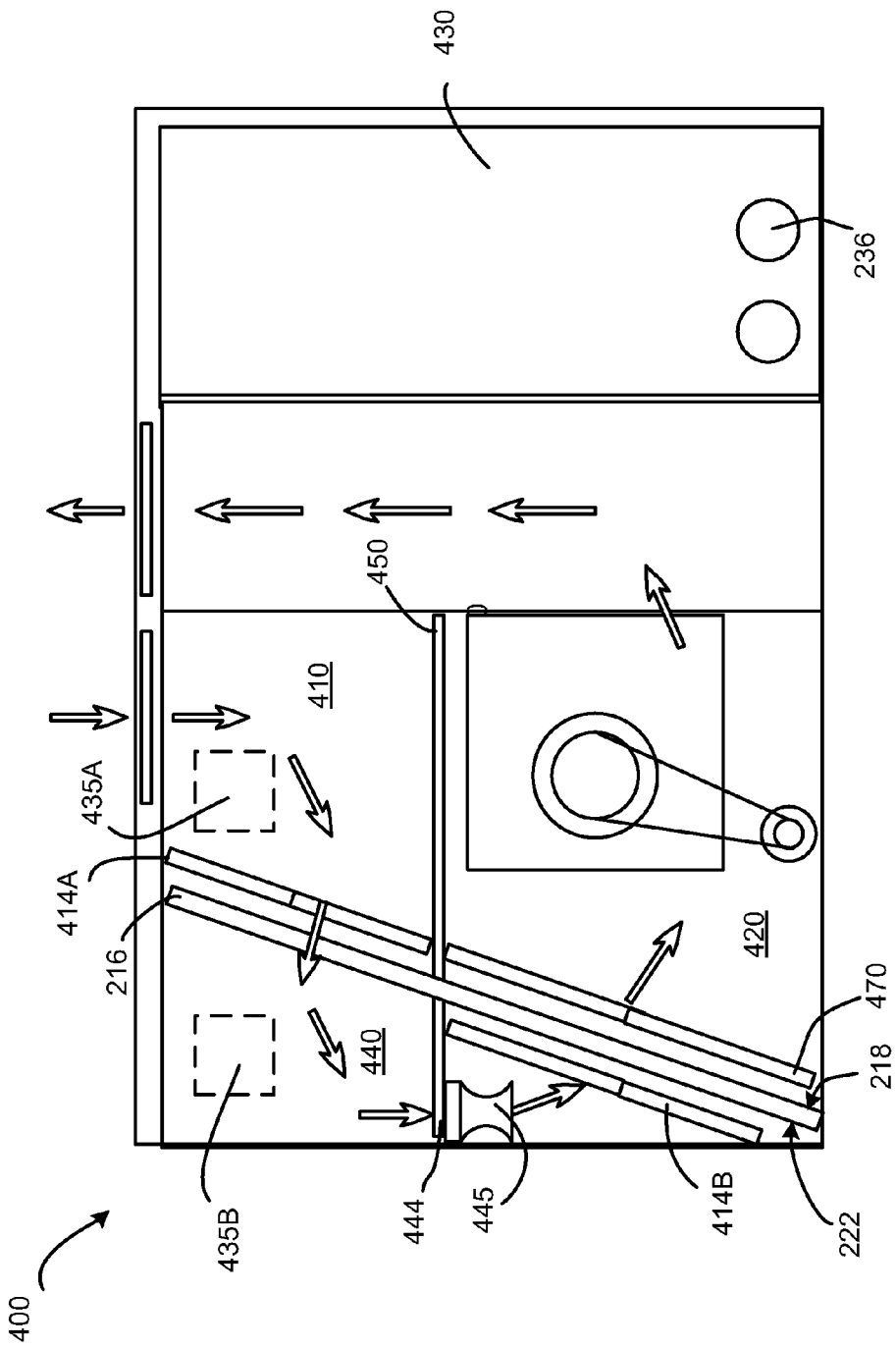
FIG. 4 is a plan view of an air conditioning unit including a hot gas reheat coil and possible return air locations according to an alternative embodiment of the present disclosure.

FIG. 3 illustrates a perspective view of the air conditioning device 200 shown in FIG. 2. As described above in FIG. 2, the air conditioning device 200 includes the pre-conditioned air passage chamber 210 that includes an air entry aperture concealed by a plurality of hooded covers 370 attached to the air conditioning device 200. The hooded covers 370 may reduce the risk of rain water and other undesirable objects like dust, bugs and microorganisms entering the air conditioning device 200. Air enters the pre-conditioned air passage chamber 210 of the air conditioning device 200 and then passes through the filter 214, which may be a filtering system that includes a series of filters stacked together or a single filter that filters outside air before the air is routed to the partially-conditioned air passage chamber 240. As seen in FIGS. 2A and 3, the filter 214 may be oriented at any angle with respect to the cooling coil system 216. Moreover, as seen in FIG. 4, it should be appreciated that the filter 214 may be located in any or all of the pre-conditioned air passage chamber 210, partially-conditioned air passage chamber 240 and the post-conditioned air passage chamber 220. The air conditioning device 200 includes an access door 374 that may provide access to the pre-conditioned air passage chamber 210 and the filter 214, such that the filter 214 may be replaced by gaining access through the access door 374.

After the air passes through the filter 214, the air enters the cooling coil system 216 from the first surface 218 and passes through the cooling coil system 216 and exits in to the partially-conditioned air passage chamber 240 through the second surface 222. The air conditioning device 200 further includes an air flow diversion component 246, which is positioned inside the partially-conditioned air passage chamber 240 such that air entering the partially-conditioned air passage chamber 240 is prevented from exiting the partially-conditioned air passage chamber 240 from a region closest to the partition 250. Although the air conditioning device 200 may operate even without the air flow diversion component 246, those skilled in the art will appreciate that the cooling coil system 216 may not receive a uniform air flow volume throughout the first surface 218 and second surface 222 of the cooling coil system 216. Therefore, operating without the air flow diversion component 246 may adversely affect the performance of the cooling coil system 216.

The air in the partially-conditioned air passage chamber 240 then passes through a diffuser 244. As seen in FIG. 3, one side of the air flow diversion component 246 is in contact with the cooling coil system 216 and an opposite side of the air flow diversion component 246 is in contact with the diffuser 244. After the air passes the diffuser 244, the air exits the partially-conditioned air passage chamber 240 from the second surface 222 of the cooling coil system 216 and passes through the cooling coil system 216 and enters the post-conditioned air passage chamber 220 from the first surface 218.

FIG. 4 shows an alternative embodiment of the air conditioning device shown in FIG. 2. Air conditioning device 400 receives both outside air and return air from the facility that it is servicing. The air conditioning device 400 includes two filters 414A and 414B that operate similar to the filter discussed above in FIG. 2A and FIG. 3. Further, the air conditioning device 400 includes a first return air aperture 435A and a second return air aperture 435B. The return air apertures 435A and 435B are openings that allow air inside the facility to return to the air conditioning device 400 so that the return air may be re-circulated back in to the facility after being conditioned again. The return air aperture 435A may be located in the pre-conditioned air passage chamber 440. However, it should be appreciated that because the return air may be cooler than the outside air on a hot day, the return air does not need to be cooled as much as the outside air. Therefore, in order to conserve energy and make the air conditioning device 400 more efficient, the return air aperture 435B may be alternatively or additionally located in the partially-conditioned air passage chamber 440 with respect to the pre-conditioned air passage chamber 410 and corresponding return air aperture 435A. If the return air aperture 435B is located in the partially-conditioned air passage chamber 440, the partially-conditioned air, including the return air may pass through filter 414B, such that undesirable objects entering through the return air aperture 435B are filtered before the conditioned air is supplied to the facility again. It should be understood that the air may be filtered in many ways that are already known in the art, and filters may be located in areas mentioned in this disclosure, or any other location within the air conditioning device 400.

According to the embodiment shown in FIG. 4, the air conditioning device 400 further includes a hot gas reheat coil 470. The hot gas reheat coil 470 may be any hot gas reheat coil traditionally used within an air conditioning device. By positioning the hot gas reheat coil 470 close to the cooling coil system 416, conditioned air coming out from the cooling coil system may be routed through the hot gas reheat coil 470 to heat the conditioned air prior to the air being supplied to the facility.

Additionally, FIG. 4 illustrates the use of a plug fan 445 that is positioned within the partially-conditioned air passage chamber 440. The plug fan 445 may be a part of the diffuser 444. The plug fan 445 may allow for better circulation of the air by creating a pressure difference between the pre-conditioned air passage chamber 410 and the post-conditioned air passage chamber 420. In alternative embodiments, the plug fan 445 may be located at various locations within the air conditioning device 400 to push or pull the air through the air conditioning device 400. It should be appreciated that any type of fan may be used alternatively, or in addition to the plug fan 445. Further, the use of any fan is optional as various embodiments may not include the use of a fan, as described in the embodiment shown in FIG. 2.

Referring to FIG. 5, an air conditioning device 500 is shown that is similar to the air conditioning device 200 shown in FIG. 2, except that the air conditioning device 500 includes a dehumidification wheel 576, such as a desiccant wheel for removing the moisture from the conditioned air as it enters the post-conditioned air passage chamber 520 from the partially-conditioned air passage chamber 540. The dehumidification wheel 576 may include a honeycomb filter, made from a material that has the ability to absorb heat and moisture and allow air to pass through the dehumidification wheel 576. The dehumidification wheel 576 is positioned such that the wheel lies in a plane perpendicular to the partition. Therefore, when the dehumidification wheel 576 rotates, a portion of the dehumidification wheel 576 is rotating in the pre-conditioned air passage chamber 510 and another portion of the dehumidification wheel 576 rotates in the post-conditioned air passage chamber 520.

Conditioned air exiting the cooling coil system 516 passes through the dehumidification wheel 576 where the dehumidification wheel 576 absorbs moisture from the air, dehumidifying the air before it enters the facility. Moisture trapped in the dehumidification wheel 576 is delivered to the pre-conditioned air passage chamber 510 where the moisture is mixed with the pre-conditioned air that enters the pre-conditioned air passage chamber 510. As the moisture laden pre-conditioned air comes in contact with the cooling coil system 516, moisture condenses on the cooling coil system 516, improving the efficiency of the cooling coil system 516. Therefore, the dehumidification wheel 576 serves to dehumidify the air being supplied to the facility, while improving the efficiency of the cooling coil system 516. Those skilled in the art will appreciate that potential applications of the present embodiment in industry may exist where the supply air needs to be relatively dry, such as at a grocery store. In grocery stores, wet air blowing near freezers may cause the moisture from the air to condense on the freezer displays, fogging up the windows.

In FIG. 5, the air conditioning device 500 also includes a pair of diffusers 544A and 544B that are positioned in the partially-conditioned air passage chamber 540, as shown in FIG. 5. Diffuser 544A aligns the air flow for efficient flow through a plug fan 545 that is positioned between the two diffusers 544A and 544B. Diffuser 544B aligns the air flow exiting the plug fan 545 for flow through the cooling coil system 516. Further a return air aperture 535A may allow return air to enter the air conditioning device 500 via the pre-conditioned air passage chamber 510.

Figure 6:
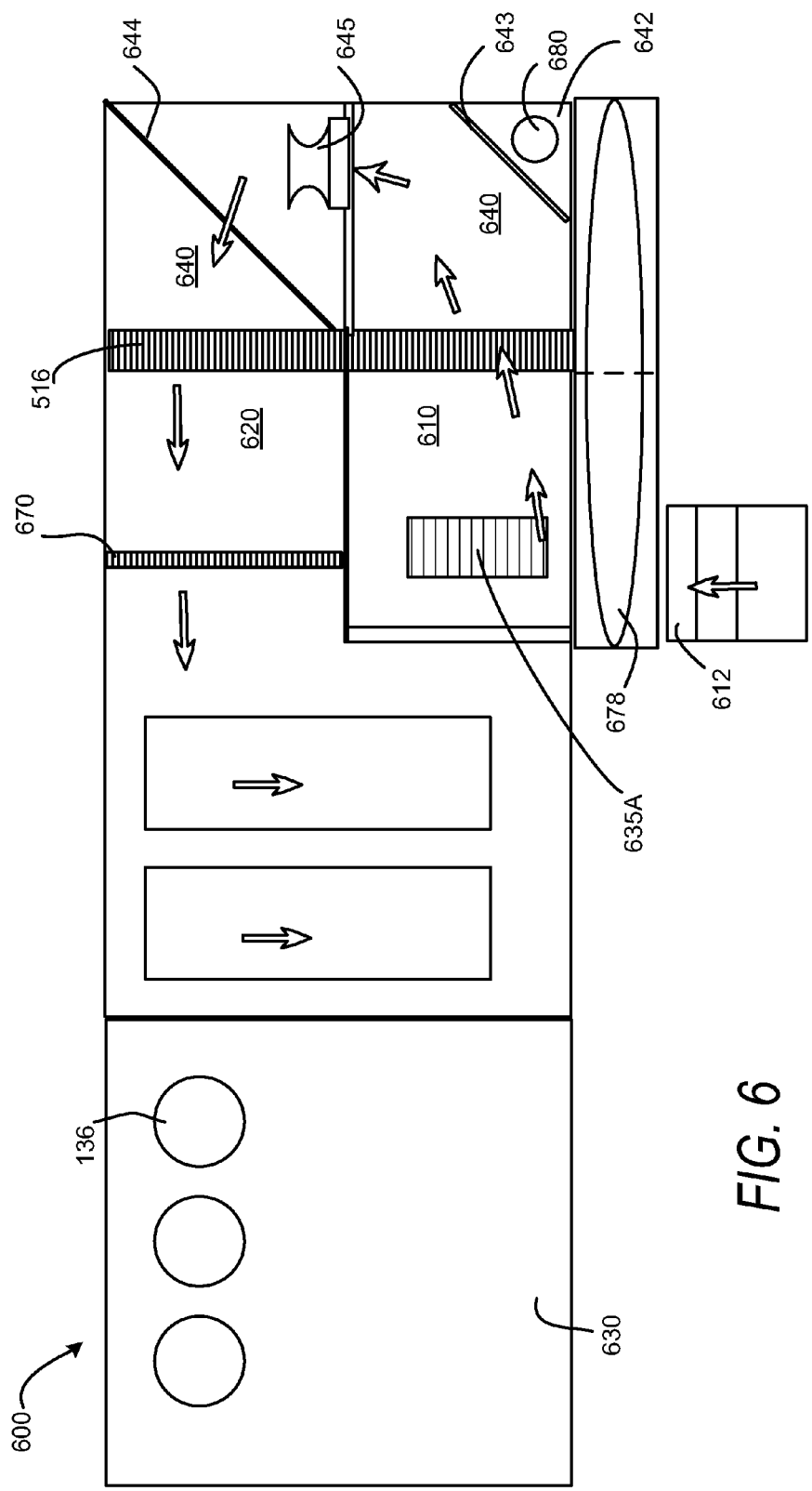
FIG. 6 is a plan view of an air conditioning unit including an energy wheel positioned outside the air conditioning unit according to an alternative embodiment of the present disclosure.

FIG. 6 shows an air conditioning device 600 similar to the air conditioning device 500 in FIG. 5 except that the dehumidification wheel is no longer inside the air conditioning device, but rather an energy recovery wheel 678 is positioned on the side of the air conditioning device 600. In order to implement this embodiment, a return air portion 642 of the partially-conditioned air passage chamber 640 may be allocated by partitioning the partially-conditioned air passage chamber 640 using a partitioning component 643. A return air fan 680 may be positioned such that return air exhausted from the facility is passed through the energy recovery wheel 678 and delivered to the air entry aperture 612, where the outside air enters the pre-conditioned air passage chamber 610. By reclaiming some of the return air, those skilled in the art will appreciate that the outside air entering the air conditioning device 600 will be cooler. By cooling the outside air before entering the air conditioning device 600, the cooling coil system 616 will have to do less work to bring the air temperature down to the desired range.

The energy recovery wheel 678 may be the same as the dehumidification wheel 576 and in one embodiment, both the dehumidification wheel 576 and the energy recovery wheel 678 may be used simultaneously. By positioning the dehumidification wheel 576 on the side of the air conditioning device 600, the dehumidification wheel 576 now acts as an energy recovery wheel 678.

Those skilled in the art will appreciate that the air conditioning device 600 operates under similar principles as a conventional air conditioning device 100. Therefore, by modifying the air flow path through a conventional air conditioning device in the manner described herein, the modified air conditioning device may be utilized to condition outside air without changing out the existing components, such as the cooling coil or blower. However, these components may be adjusted for improved performance of the air conditioning device. For instance, the air velocity control device, such as a blower operated by a blower motor may need to adjust the speed of the motor or the size of the blower so that the air passing through the cooling coil system travels within desirable operating velocities. If the air velocity is too slow, frosting may occur on the cooling coil system, impeding the efficiency of the air conditioning device. On the other hand, if the air velocity is too fast, sufficient cooling will not take place and the conditioned air will be warmer than the desired temperature range. Furthermore, filters may be positioned at various locations inside the air conditioning device. Those skilled in the art will appreciate the different embodiments in which these filters may be placed, keeping in mind, determining factors such as the quantity of filters, the size and shapes of filters and the position of the filters to grant easy access to the filters when it is time to replace them.

Those skilled in the art will also appreciate that although the present disclosure teaches routing the air through a single cooling coil system twice, air may be routed through a single cooling coil system any number of times without departing from the scope of this disclosure. Further, the scope of this disclosure is not limited to cooling coil systems that are arranged in a single plane. Rather, the cooling coil system may be arranged in more than one plane, and more than one cooling coil system may be used.

Figure 7:
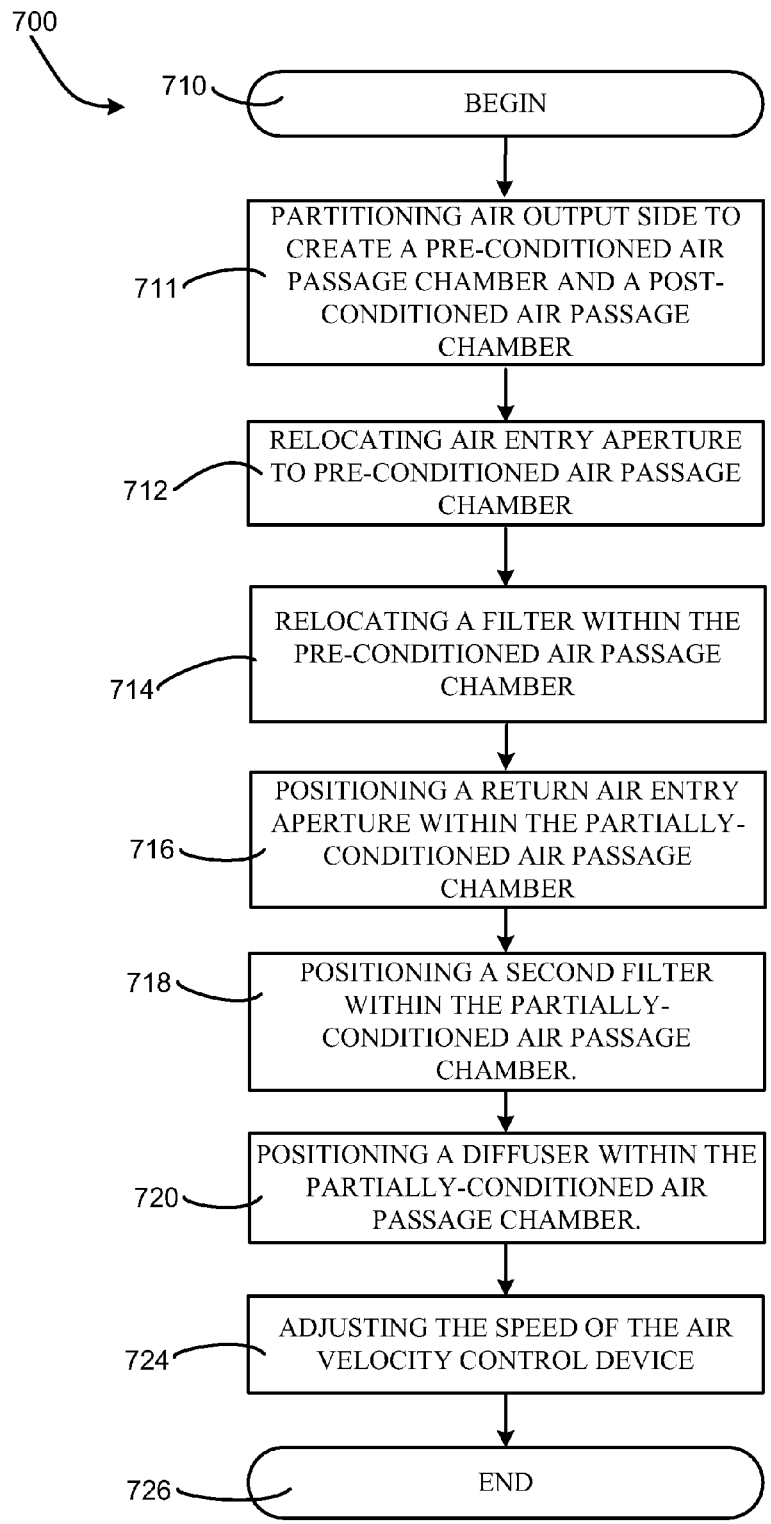
FIG. 7 is a logical flow diagram illustrating a process of reconfiguring a return air conditioning device to an outside air conditioning device according to the present disclosure.

Referring to FIG. 7, and using FIGS. 1 and 2 as reference, FIG. 7 shows a logical flow diagram illustrating the process of reconfiguring a return air conditioning device 100 to an outside air conditioning device 200. It should be appreciated that more or fewer operations may be performed than shown in the figures and described herein. These operations may also be performed in parallel, or in a different order than those described herein. Moreover, while this process specifically addresses reconfiguring a return air conditioning device 100 to an outside air conditioning device 200, the process 700 may additionally be used in manufacturing an outside air conditioning device 200 that has not been configured as a return air conditioning device 100 with minor changes noted below.

The process 700 begins at operation 711 where the air output side 120 is partitioned with an impermeable partition 250 to create a pre-conditioned air passage chamber 210 and a post-conditioned air passage chamber 220. The process 700 proceeds to operation 712, where an air entry aperture 212 is relocated to the pre-conditioned air passage chamber 210 such that outside air enters the pre-conditioned air passage chamber 210. Further, it should be appreciated that process 700 may include sealing the original old air entry aperture 112 to create the closed partially-conditioned air passage chamber 240. Should the process 700 be used to manufacture a new outside air conditioning device 200 that has not been previously configured as a return air conditioning device 100, then sealing an original air entry aperture 112 would not be required. At operation 714, a filter 214 is relocated within the pre-conditioned air passage chamber 210, in between the air entry aperture 212 and the cooling coil system 216 to prevent undesirable materials in the outside air from passing through the cooling coil system 216.

The process 700 then proceeds to operation 716, where a return air entry aperture 235B is positioned within the partially-conditioned air passage chamber 240 to allow return air from the facility to be re-circulated to the facility after being conditioned again. In operation 718, a second filter (see 414B in FIG. 4) is positioned within the partially-conditioned air passage chamber 240 that may be used to prevent undesirable particles from partially conditioned air, including return air from being supplied to the facility. In operation 720, a diffuser 244 is positioned within the partially-conditioned air passage chamber 240. The diffuser 244 may be positioned at various locations within the air conditioning device as described herein.

The process 700 continues to operation 722, where the velocity at which the air travels through the cooling coil system 216 is adjusted by either reducing the speed of the blower motor 224 of the return air conditioning unit or by replacing the blower 226 and motor 224 with an air velocity control device 225 that is suitable for outside air conditioning units. Should a new outside air conditioning device 200 be manufactured, the desired blower motor 224 having the desired operating characteristics may be utilized without reducing the speed of an existing motor. In an alternative embodiment, a variable drive fan may be utilized to regulate the speed of the air velocity control device 225. The velocity at which the air passes through the cooling coil system 216 is controlled, in part, by the blower and the air arrives at its desired temperature by travelling through the cooling coil system at the appropriate velocity that corresponds to the desired temperature. As stated above, it may be appreciated that the process 700 may include one, some or more than the operations detailed in FIG. 7. For instance, the use of filters, diffusers, fans and air velocity control devices are desirable but not necessary to reconfigure the return air conditioning device to an outside air conditioning device. In one embodiment, partitioning the air output side and relocating the air entry aperture may be sufficient to reconfigure the return air conditioning device to an outside air conditioning device.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An air conditioning device, comprising:
   a pre-conditioned air passage chamber comprising an air entry aperture to receive air;
   a post-conditioned air passage chamber comprising an air exit aperture to supply air;
   an impermeable partition separating the pre-conditioned air passage chamber and the post-conditioned air passage chamber;
   a partially-conditioned air passage chamber fluidly connecting the pre-conditioned air passage chamber and the post-conditioned air passage chamber;
   a plurality of walls encompassing the pre-conditioned air passage chamber, the partially-conditioned air passage chamber, and the post-conditioned air passage chamber, providing a route for a single path of air sequentially from the air entry aperture through the pre-conditioned air passage chamber, the partially-conditioned air passage chamber, and the post-conditioned air passage chamber to the air exit aperture; and a cooling coil system positioned within the plurality of walls to provide a permeable wall to each of the pre-conditioned air passage chamber, the post-conditioned air passage chamber, and the partially-conditioned air passage chamber, wherein the cooling coil system is configured to receive the single path of air at a first surface from the pre-conditioned air passage chamber, to condition the single path of air passing from the first surface through a second surface into the partially-conditioned air passage chamber, to receive the single path of air at the second surface from the partially-conditioned air passage chamber, and to further condition the single path of air passing from the second surface back through the first surface into the post-conditioned air passage chamber.

2. The air conditioning device of claim 1, further comprising a diffuser positioned within the partially-conditioned air passage chamber.

3. The air conditioning device of claim 2, wherein the diffuser further comprises an air flow diversion component positioned within the partially-conditioned air passage chamber.

4. The air conditioning device of claim 1, wherein the post-conditioned air passage chamber further comprises a reheat coil system positioned in the post-conditioned air passage chamber configured to receive the single path of air from the first surface of the cooling coil system, treat the single path of air and route the single path of air to the air exit aperture.

5. The air conditioning device of claim 1, wherein the post-conditioned air passage chamber further comprises an air velocity control device operative to route the single path of air through the air conditioning device.

6. The air conditioning device of claim 1, wherein the partially-conditioned air passage chamber further comprises an air velocity control device operative to route the single path of air from the pre-conditioned air passage chamber to the partially-conditioned air passage chamber to the post-conditioned air passage chamber.

7. The air conditioning device of claim 1, wherein the impermeable partition splits the first surface of the cooling coil system to define a horizontal split configuration or a vertical split configuration.

8. The air conditioning device of claim 1, wherein the partially-conditioned air passage chamber further comprises a return air intake aperture configured to provide return air to the partially-conditioned air passage chamber.

* * * * *